United States Patent [19]
Pauley

[11] Patent Number: 5,900,916
[45] Date of Patent: May 4, 1999

[54] APPARATUS FOR CONTROL OF IMAGES FROM MULTIPLE SOURCES

[75] Inventor: Nicholas J. Pauley, Capistrano Beach, Calif.

[73] Assignee: Mitsubishi Consumer Electronics America, Inc., Norcross, Ga.

[21] Appl. No.: 08/777,508

[22] Filed: Dec. 30, 1996

[51] Int. Cl.$^6$ ...................................................... H04N 5/45
[52] U.S. Cl. ........................... 348/565; 348/564; 348/588
[58] Field of Search ..................... 348/564, 565, 348/567, 584, 586, 588, 598; H04N 5/445, 5/45

[56] References Cited

U.S. PATENT DOCUMENTS 5,506,628  4/1996  Chun ........................................ 348/565

OTHER PUBLICATIONS

Panasonic PT–51G50 Color Video Projection System Operating Instructions.
Pioneer SD–P5795W Projection Monitor Receiver Operating Manual.
Magnavox Projection Television Owner's Manual.
RCA Color TV User's Guide.
Sony KP–53XBR45 and KP–61XBR48 Color Rear Video Projector Operating Manual.
Mitsubishi TS–50611, VS–55601, VS–60601, VS–60621, and VS–70601 Projection TV Owner's Guide.
Mitsubishi CS–27609, CS–32509, CS–36509, CS–36609 and CS–40509 TV Owner's Guide.

Primary Examiner—Sherrie Hsia
Attorney, Agent, or Firm—Lyon & Lyon LLP

[57] ABSTRACT

Apparatus is provided for presentation of images from multiple sources on a monitor or television at the same time. In the preferred embodiment, the system comprises a picture-in-picture display, wherein a main picture has overlayed on it a picture-in-picture (PIP) occupying a minor portion of the main picture. In one mode of operation, called a review mode, the PIP displays the channel which had been displayed on the main picture prior to the channel change. In another mode of operation, called the preview mode, the main picture is selected by operation of a channel selection device, such as an up channel selector, and the PIP contains the next sequential channel in the list associated with that channel selection device. Such a list may be predefined, such as in the case of sequential channel selection either in an up or a down direction, or by use of a favorite channel list. The list may ultimately be determined dynamically, such as where a database is accessed, such as a listing of channels from a cable company. Apparatus is provided for the storage of the mode selection as entered by the user, for example, whether the review mode or preview mode has been selected.

10 Claims, 6 Drawing Sheets

APPARATUS FOR CONTROL OF IMAGES FROM MULTIPLE SOURCES

FIELD OF THE INVENTION

This invention relates to methods and apparatus for use in conjunction with display systems, such as televisions or computer monitors, where multiple images are displayed simultaneously. Most particularly, these inventions relate to televisions having a "picture-in-picture" feature.

RELATED APPLICATION INFORMATION

This application is related to applications entitled: "Methods for Control of Images from Multiple Sources", U.S. Ser. No. 08/777,499, "Remote Control Television System with Security Access Features", U.S. Ser. No. 08/777,509, "User Identification Security System", U.S. Ser. No. 08/777,497, and "Remote Control With Lockable Keys", U.S. Ser. No. 08/775,093, all incorporated herein by reference and filed on same date.

BACKGROUND OF THE INVENTION

In their earliest forms, display systems such as televisions or computer monitors displayed a single program or series of images from a single source, such as a selected television station or program. Within the field of television, a "picture-in-picture" system was developed. This system allowed the television to display a television program on the entire screen, in conventional format, and in addition to display a smaller picture from a different channel, in shrunken form, on the same screen. In essence, such systems comprised two television pictures on one screen, a main picture comprising a standard television picture and a smaller subpicture called the PIP ("picture-in-picture"). Typically, the PIP was less than ¼ of the size of the screen. The PIP ordinarily resided in the lower right quadrant of the main picture, though with a border of the main picture surrounding the PIP. Typically, the PIP provided an apparently complete image of the second channel to the viewer. While in actuality, various bits of information, denominated pixels, were dropped from the actual displayed PIP, given the relatively smaller size of the PIP, the image appeared substantially complete to the viewer.

Analog television technology generally did not permit the displaying of multiple images from multiple channels, such as in a PIP system. In the case of analog television technology, the main picture set to a first channel was derived from a first television station and the second channel for the PIP was derived from a second television station. Since the analog television system displayed images via a raster scanned CRT where the image information was received via the broadcast and synchronized with the monitor by a timing pulse (sync pulse) there was no necessary correlation for synchronization between the two channels. By way of example, one channel could be scanning the upper left portion of the picture while the second channel would be scanning the bottom left portion of the picture. Synchronization in analog systems was generally not feasible.

Digital electronics facilitated generation of overlapping displays. In certain versions, the main picture was generated and displayed as before. The PIP was generated by a PIP circuit which stored images, or selected pixels of the image, coming from the second channel. Information regarding the scanning location on the main picture was provided to the PIP circuitry. Through this synchronization, the PIP circuitry provided output to the screen or monitor at the appropriate time. The image information in the PIP circuitry was stored in digital memory. That image information was updated as received from the channel. In this way, the raster scanned display provided the main picture as received from the television station and the PIP circuitry provided a imperceptibly delayed PIP. In this way, the synchronization problem was overcome.

The result of the PIP system was that there were, in essence, two television channels or pictures being displayed on one screen. Each tuner could be set independently. In this way, the viewer could select a first channel for display on the main picture and a second channel for display on the PIP. In use, the PIP feature was particularly advantageous for watching two shows in which the time during which action occurred was relatively minor compared to the overall program duration, such as in sporting events, especially in football. The viewer could tune each tuner to a separate game, with the PIP being large enough to provide a viewable image, especially one sufficient to inform the viewer of impending action. At that point, the viewer could change channels, causing the PIP to be displayed as the main picture.

A swap or exchange feature was often employed in PIP systems. This feature exchanged the main picture and PIP by activation of a single button. In the sports viewing example, above, the viewer could swap the channels, maintaining as the main picture the channel with the then current action. The swap feature typically was achieved by electronically switching the output from the two tuners, such that the output from the first tuner set to a first channel was supplied as input to the PIP circuitry, and the output of the second tuner set to the second channel was provided as the input to the main picture display circuitry. In this way, the tuners remained set at a given channel, and the outputs of the tuners were electronically switched as inputs for further processing.

While such PIP systems had good utility in the applications described, they were subject to operational limitations. Since the systems in essence provided two separate televisions combined for a display on one screen, the user was required to tune the two televisions, even prior to invoking a swap feature. Further, there is a latency period between displaying channels during a channel change operation. This latency between the time the channel change is initiated and the time at which the television displays the next channel may result in loss of desired information.

Computer display systems have utilized windows based display systems. A given window typically displays information from a source, such as a screen generated by a software program. These windows are often arranged in an overlapping arrangement. Certain systems permit toggling or cycling through various windows, such as to permit the user an unobstructed view of a complete window. Generally, such systems only change the contents of the currently selected window.

Accordingly, the current state of method and apparatus for the control of images from multiple sources has limits on the modes of operation.

SUMMARY OF THE INVENTION

Methods and apparatus are utilized for the display of images on a single screen or monitor from multiple sources. The method in its broadest aspect serves to operate a display system including a monitor capable of displaying multiple channels simultaneously on the monitor, the steps including displaying a first channel on a first portion of the monitor and displaying a second channel on a second portion of the monitor, and thereafter, changing the channel on the first portion of the monitor to a third channel, which is different from the first and second channels, and simultaneously changing the channel on the second portion of the monitor to the first channel.

In a preferred mode of operation, termed the review mode, initially a first channel is displayed on the main picture portion of the display and a second channel is displayed in the PIP. Upon changing the first channel to a third channel for the main picture, the first channel is then displayed in the PIP. Thus, the third channel is displayed on the main picture and the first channel is displayed on the PIP. In operation, the review mode upon a change of channel on the main picture moves the formerly viewed main picture to the PIP. Subsequent changes to the main picture cause the automatic placement of the then main picture channel to the PIP.

In yet a second preferred mode of operation, termed the preview mode, a method of operation of a display system including a monitor capable of displaying images from multiple channels simultaneously on the monitor comprises the steps of, first, displaying images from a first channel on a first portion of the display system by activation of a first mode display change device, and displaying images from a second channel on a second portion of the display system, where the second channel is the channel which would result on the first portion of the display from a next or subsequent activation of the mode display change device. Stated differently, selection of a channel for the main picture by a channel selection device results in selection of the next two channels from a list associated with the channel selection device, where the first list entry is displayed on the main picture and the second list entry is displayed on the PIP. By way of example, one possible mode change device is an up channel button. If the up channel button is utilized to select the first channel displayed on the main picture portion of the monitor, the PIP contains the channel which would be displayed on the main picture by the next or sequential activation of the up channel button, namely the next higher channel. By displaying in the PIP the channel which would next be displayed on the main picture based upon the user invoking the same mode change device, the user may preview in the PIP the next channel in sequence.

In the preview mode, the next or subsequent channel may be determined from a static list, a dynamic list, or be determined by pattern recognition. In the case of a static list, examples of static lists may include the channel up, so as to invoke the next higher channel in the PIP, channel down, so as to invoke the next lower channel in the PIP, a favorite channel list so as to invoke the next favorite channel in a user defined list of channels. Dynamic lists provide a basis for PIP channel selection in the preview mode. By way of example, a dynamic list may be formed through use of a database coupled with a search criteria. A database of currently available programming available to the viewer may be searched by desired search criteria, such as comedies, horror movies, action shows or any other searchable criteria. The PIP may then display the next channel which would be displayed on the main picture from a next or subsequent activation of the mode selection device. Alternatively, the user's prior channel entries may be examined for the existence of a pattern. The recognized pattern may be utilized by the PIP in the preview mode for display of the next channel.

In operation, the viewer typically would invoke either the review mode or the preview mode. This mode selection would be utilized by the system until changed. A default selection may be incorporated within the system. While it is contemplated in the preferred embodiment that a single mode would be utilized at a given time, both the preview and the review mode could be utilized simultaneously if two PIPs were displayed on the screen or monitor.

Structurally, the system generally comprises a monitor, a PIP circuit which serves to display a first channel on a first portion of the monitor and to display a second channel on a second portion of the monitor, the PIP circuit providing some or all of the first and/or second picture information, a multiple channel selection device and a control system adapted to receive a mode status, e.g., preview or review mode, and in the preview mode, an indication of the input from the sequential selection device and access to a static or dynamic list, or a pattern recognition system. In the preferred embodiment, the multiple channel selection device functions to select two or more channels from multiple channel sources, and preferably comprises two tuners. Alternatively, the multiple channel selection device may comprise a time multiplexed system, such as where the source provides the channels in a timed multiplexed manner or the device accesses the channels in a time multiplexed manner. In the preferred embodiment, the control system utilizes a microprocessor or microcomputer to implement the methods of this invention. In the review mode, the control system serves to pass the channel from the main picture to the PIP upon change of the channel on the main picture. An effective channel passing pathway is thereby established. In the preview mode, the control system serves to select the PIP channel by receiving as input the indication of the sequential selection device, e.g., up channel, down channel, favorite channel list, and to invoke that request again to select the channel for the PIP. The control system outputs the channel selection to the multiple channel selection device. A mode memory is provided in which is stored the indication from the user of the mode selected, e.g., preview mode or review mode. Memory is also provided to store the indication of the sequential selection device utilized by the viewer.

In yet another aspect of this invention, the PIP display is modified over time. In one aspect, the PIP is displayed for a first desired period of time and then is discontinued, though reinvoked upon a channel change on the main picture. Alternatively, the PIP is displayed for a predetermined period of time and then fades over a second predetermined period of time, permitting the viewer unobstructed view of the main picture.

Accordingly, it is an object of this invention to provide an improved apparatus and method for operation of a PIP system.

It is yet a further object of this invention to provide for an enhanced mode of operation of the PIP system, permitting automatic change of the PIP upon change of the main picture from a first channel to a third channel.

DETAILED DESCRIPTION OF THE INVENTION

As used herein, the following terms are to have the meaning described below.

A "channel" means a discrete selection of displayable images, such as in a television system being television video signals (such as defined by a frequency or range of frequencies) or with graphics and/or text from a source such as the Internet (as defined by an address). Any mode of input may be utilized, for example, a television station, a cable system, satellite, a video tape recorder/player and DVD.

A "source" means a provider of information, such as a television station, cable provider, Internet site or the like, and may provide one or more channels.

A "monitor" means any display or device for the visual depiction or signals or information, such as a CRT in a television system or a display or monitor in a computer or similar system. The term covers any type of display or monitor, e.g., cathode ray tube (CRT), plasma display, flat panel, etc.

A "picture-in-picture" or "PIP" means a main picture with a smaller picture from a second channel overlaying the main picture.

Figure 1:
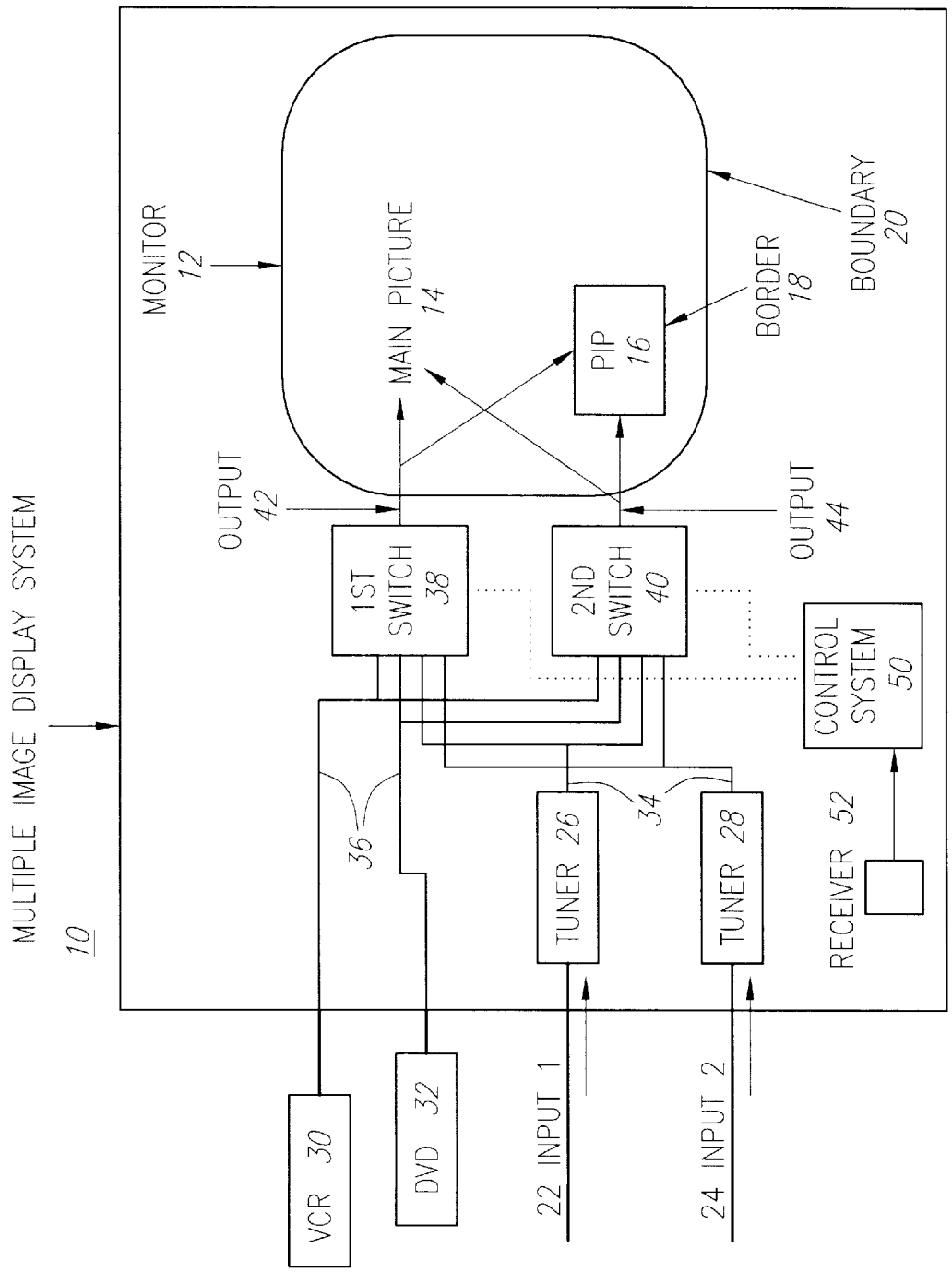
FIG. 1 shows a schematic view of a system including a television or monitor having a picture-in-picture feature.

FIG. 1 shows a schematic representation of a multiple image display system 10 such as a television system. A monitor 12 is operated in a mode so as to have a main picture 14 and a PIP 16 displayed thereon. Typically, the PIP 16 is located in the lower right hand quadrant of the monitor 12, and is disposed with a border 18 comprising a portion of the main picture 14 between the PIP 16 and the boundary 20 of the monitor 12.

The multiple image display system 10 may receive inputs from any number of sources. Input 1 22 and input 2 24 represent multiple channel inputs. These inputs are fed to tuner 1 26 and tuner 2 28, respectively. The sources for the inputs 22, 24 may be of any type, such as a television station, cable system or satellite. Additional sources such as VCR 30 and digital video disk 32 (DVD) may be supplied to the system 10. The outputs 34 from the tuners 26, 28 and the outputs 36 from alternate sources VCR 30 and DVD 32 are each supplied to a first switch 38 and a second switch 40. The first switch 38 has an output 42 which is supplied to the image generation electronics for the monitor 12. The output 44 from the second switch 40 is supplied as input to a PIP board. The output of the PIP board provides the image in PIP 16.

Figure 2:
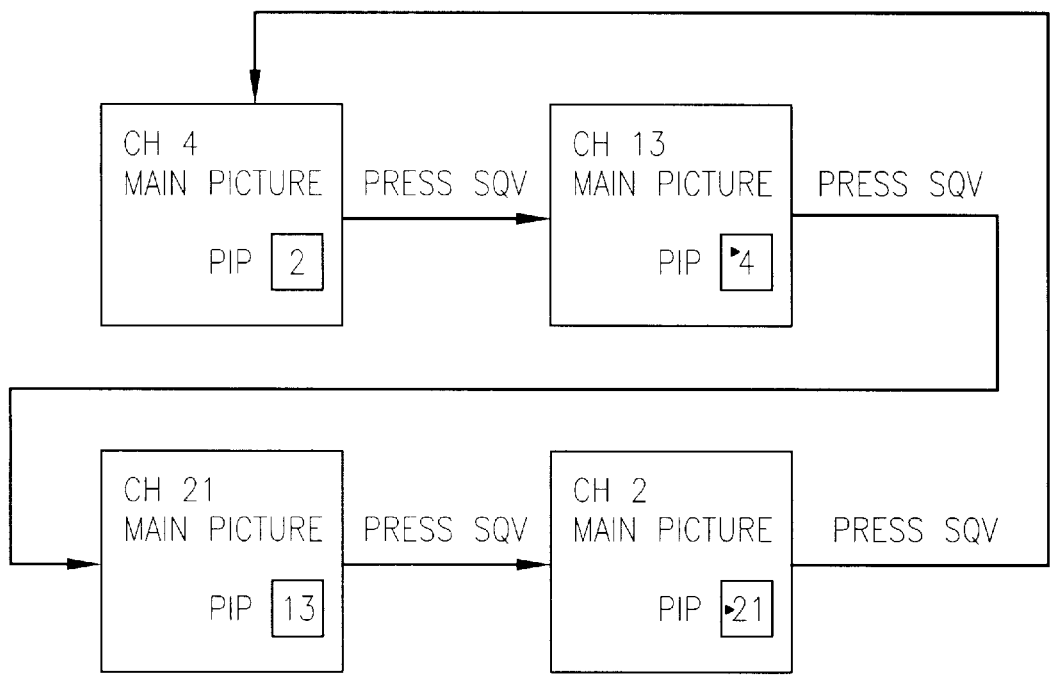
FIG. 2 shows a schematic, flowchart like schematic for the review mode.

A control system 50 directs first switch 38 and second switch 40 to select the desired channel for display on the main picture 14 and PIP 16. A receiver 52 receives remote signals, such as supplied from a remote control which are supplied to the control system 50. A mode memory 54 is provided in which is stored the indication from the user of the mode selected, e.g., preview mode or review mode FIG. 2 shows a series of four images, intended to depict the same television system at four sequential stages of operation in the review mode. The initial configuration has a main picture on channel 4 and a PIP on channel 2. When the main picture is caused to change, depicted in FIG. 2 as the main picture displaying channel 13, the review mode causes the content of the former main picture to be displayed as the PIP. FIG. 2 shows the use of the super quick view (SQV) mode of change to cause the main picture to change. However, any mode of channel change may be utilized. Various modes of entry would include: direct key entry, channel up, channel down, favorite channel list, theme key, and dynamic lists for selection based on pattern recognition. These modes will be discussed in detail in connection with the preview mode.

When the main picture is changed to a next main picture, displaying channel 21, channel 13 from main picture is displayed in PIP. Similarly, when the main picture is changed to the next main picture, channel 2, the main picture channel 21, is displayed on the PIP. In this way, irrespective of the mode of sequencing of the main pictures, the subsequent PIP displays the channel of the preceding main picture.

Figure 3:
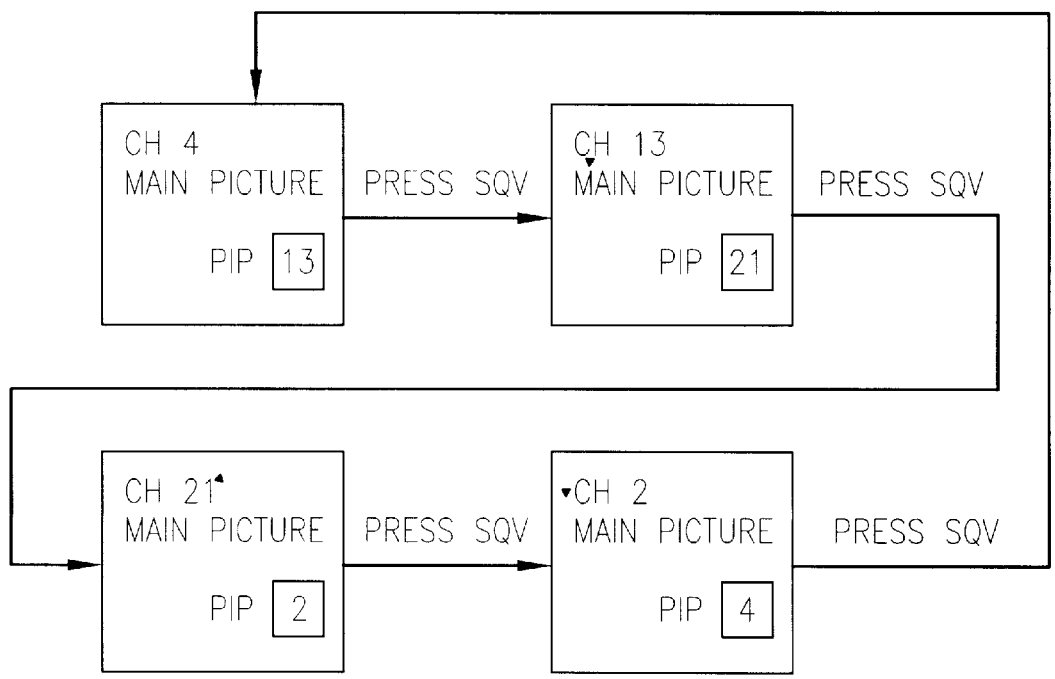
FIG. 3 shows a flowchart like schematic for the preview mode.

FIG. 3 shows a sequential view of a main picture and PIP in four successive views of the preview mode. Initial, a main picture is set to channel 4 and the PIP is set to channel 13. The main picture was selected by operation of a mode change device, such as the SQV mode change mechanism. The SQV mode change device is again invoked, causing the main picture to become channel 13, the formerly displayed PIP, and the next SQV channel, channel 21, is displayed in the PIP.

This process is repeated as desired. If the SQV mode change is again invoked, the main picture becomes channel 21, and the PIP becomes channel 2, the next channel in the SQV list. If SQV is again invoked, the main picture becomes channel 2, and the PIP becomes channel 4. As depicted in channel 3, invocation of SQV loops back to the first main picture, channel 4, and the PIP as channel 13. In this case, the SQV list comprised the channels 4, 13, 21 and 2, and recycled when complete.

Figure 4:
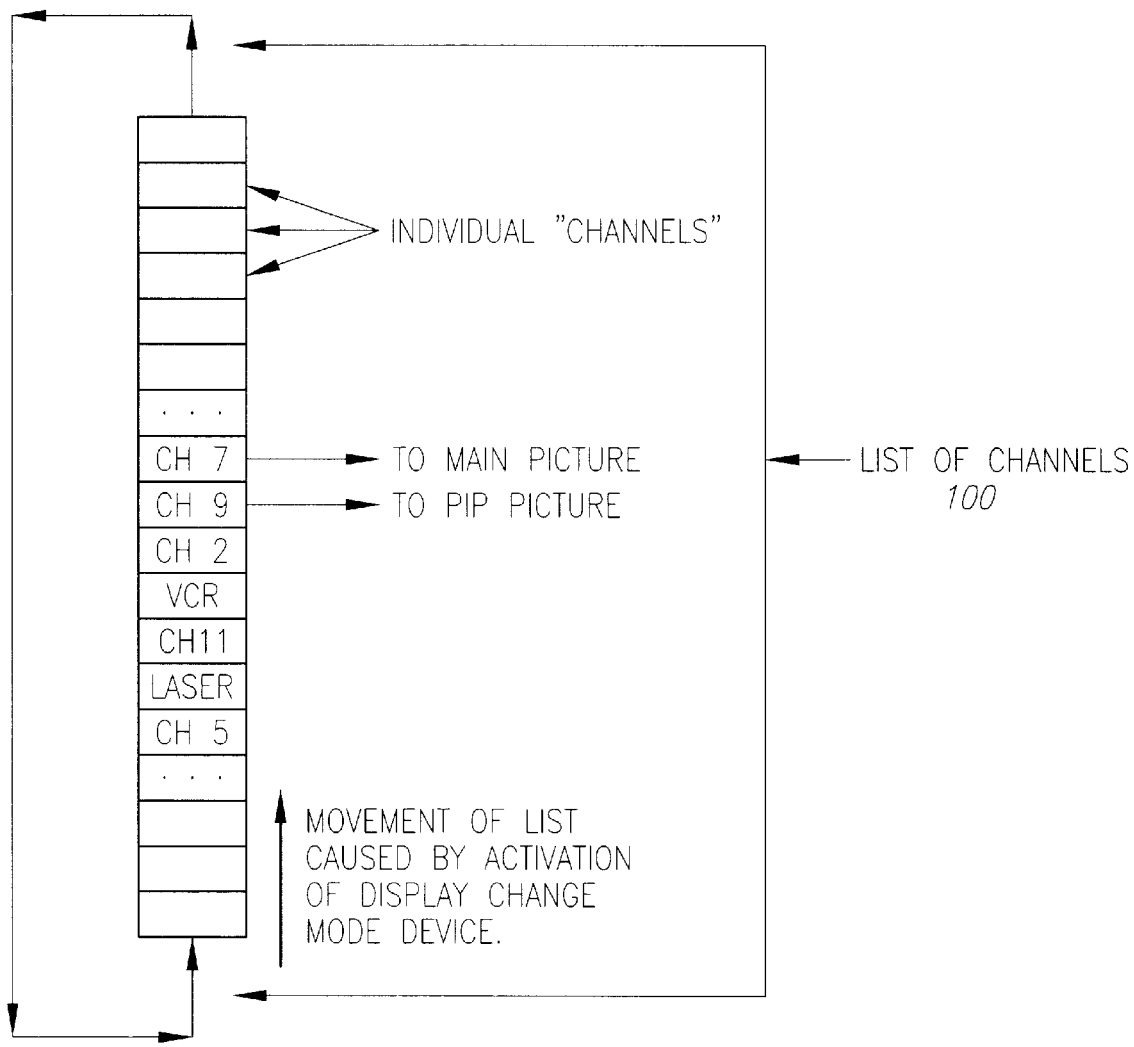
FIG. 4 shows a schematic view of the preview mode list feature.

FIG. 4 shows a conceptual depiction of the preview mode in a list format in operation. A sequential list of channels 100 comprises sequential entries. In an abstract mode, these channels may be designated n, n+1, n+2, . . . As shown in FIG. 4, the channels in sequence are listed as channels 7, 9 and 2, followed by the VCR as the source, followed by channel 11, followed by a laser disc as a source, followed by channel 5. The individual channel boxes not identified may be filled as desired in accordance with any user selection. The list loops as shown by the arrows connecting the ends of the series of boxes. Main picture selection is displayed on the main picture (14 in FIG. 1). PIP selection is displayed on PIP (16 in FIG. 1). The sequential list of channels 100 may be depicted as moving in change direction. The sequential list of channels 100 may also be viewed as looping back upon itself forming an endless loop.

The preview mode may utilize a sequential list of channels 100 from any mode of selection. The mode change may comprise a static list. For example, a channel up button invoked causes selection of a channel from a list, the subsequent activation selecting the next higher entry in the list. Similarly, a channel down key selects the next lower channel in the list. A favorite channel list typically comprises a user defined list of channels. Dynamic lists may be utilized in connection with the preview mode. For example, a dynamic list may be generated by accessing a database or source of channel information based upon a search criteria. Television systems receive database information from providers, such as on-screen guide providers such as StarSight, Gemstar and Videoguide, which may be searched by various criteria. For example, the viewer may invoke a search for all current channels carrying a program meeting a theme criteria, such as comedy shows, action movies or horror movies. Similarly, the preview mode selection may be based upon a pattern recognition based on the viewer's prior selections. For example, if the user has been inputting channels directly from the key pad, the system may recognize a pattern and make a prediction based upon it for use in the preview mode.

Figure 5:
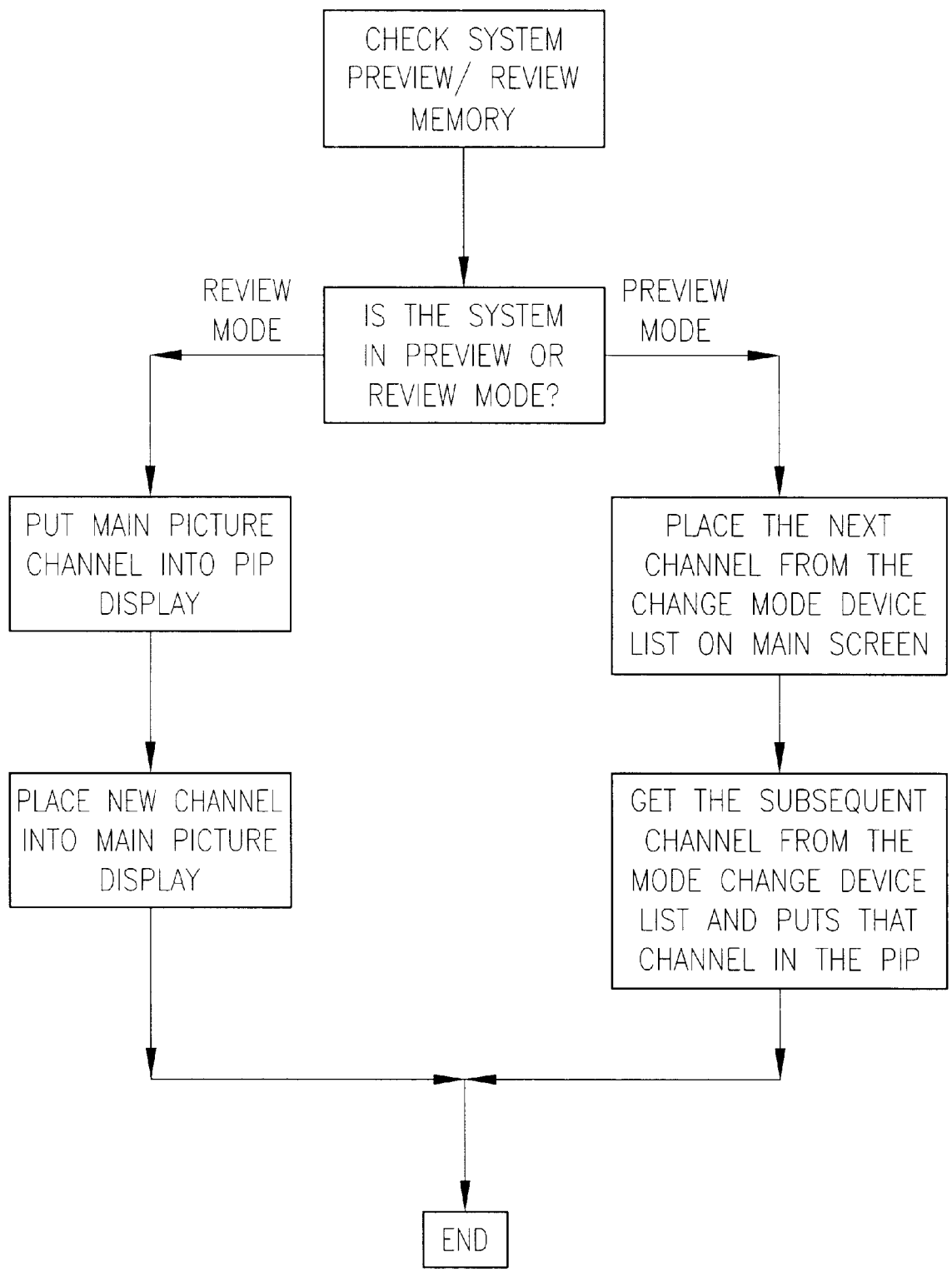
FIG. 5 shows a flowchart for operation of the overall system.

FIG. 5 shows a flowchart of the methods utilized with this system. Initially, assuming that multiple modes of operation are available in the system, a check is performed to determine the mode of operation, such as whether the review or preview mode has been selected. If the review mode has been selected, the system puts the main picture channel into the PIP display and places the new channel into the main picture display. At this point, the system awaits the next input. Alternately, if the preview mode has been selected, the system places the next channel from the change mode device list on the main screen and places the subsequent channel from the change mode device list and puts that channel in the PIP. At this point, the system awaits the next user input.

Figure 6:
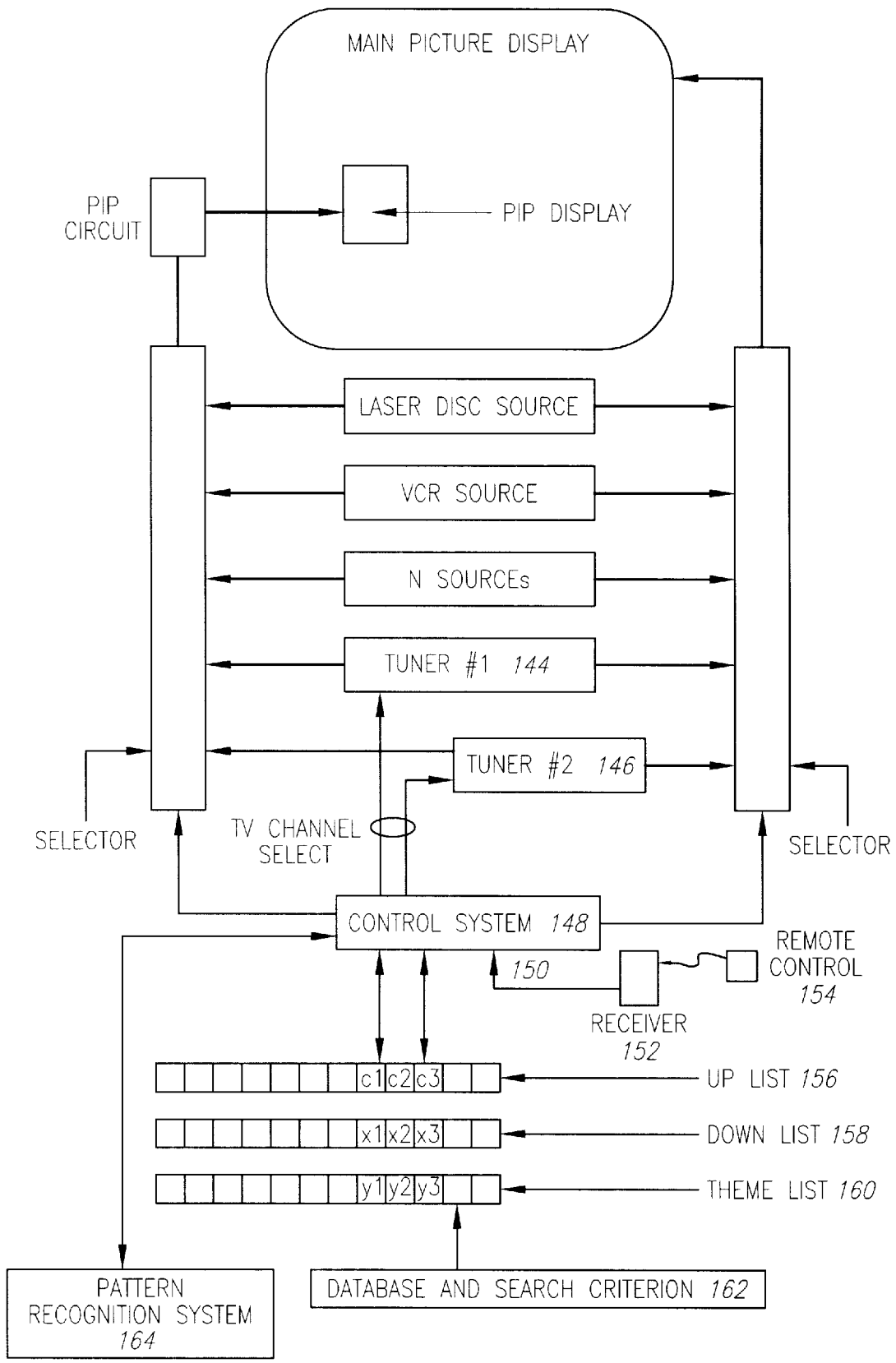
FIG. 6 shows a system level view of the hardware components of the system.

FIG. 6 shows a schematic of the main components of the system. A main picture 14 and PIP 16 receive the output from various sources. Here, tuner 1 144 and tuner 2 146 provide inputs respectively to main picture 14 and PIP 16. The control system 148 receives an input 150 from a receiver 152 such as from a remote control 154. The control system 148 determines the mode of channel selection, such as from operation of the remote control 154 and utilizes the various lists, such as up list 156, down list 158, theme list 160 (connected to database plus search criteria 162) or pattern recognition system 164. As shown in the up list 156 and down list 158, various channels (C1, C2 and C3 in up list 156 and X1, X2 and X3 in down list 158) may be designated. These lists may be arbitrarily long, and typically loop back upon themselves. The theme list 160 is designated as having channels Y1, Y2 and Y3, and while these may be a static list, such as by the user's entry of favorite channels or theme channels, the theme list may also be generated based upon accessing the database using search criteria 162. In the latter case, in the preview mode, activation of the channel selection device causes a search of the database for the first channel for display on the main picture 14 and causes retrieval of a second channel from the database for display in the PIP 16.

Figure 7:
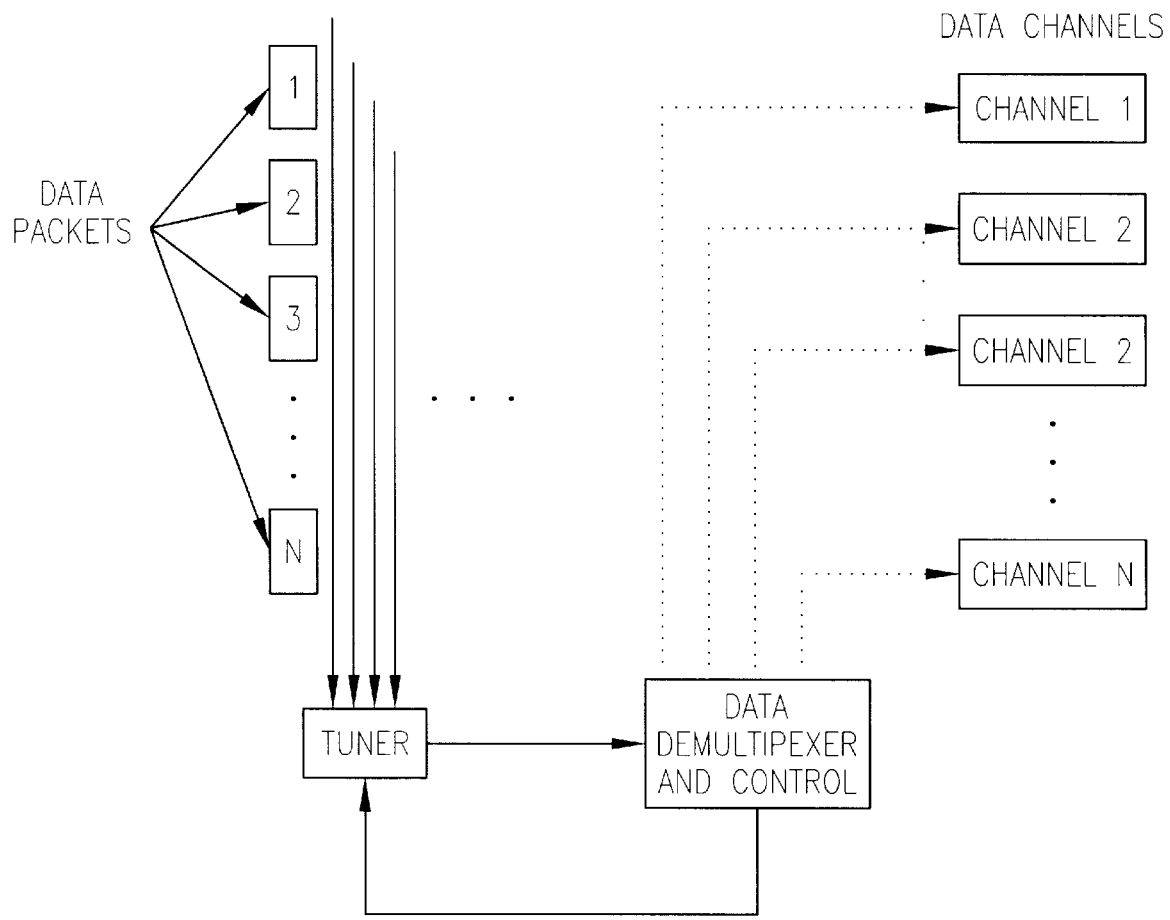
FIG. 7 shows a schematic view of an alternative use of a multiple channel selection device operable in a time multiplexed system.

FIG. 7 shows the hardware components for a system in which the information is provided in a time multiplexed manner. In such a system, a single tuner or search engine may act at different times, optionally with memory, to store previously received information. Referring now to FIG. 7, incoming data packets designated 1, 2, 3 ... N, are supplied, typically, in a time multiplexed fashion, to the tuner. A data demultiplexer and control circuit then causes generation of information as usable channels, designated channel 1, channel 2, channel 3 ... channel N.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

I claim:

1. An apparatus for the display of multiple images on a monitor comprising:

a monitor, a PIP circuit to display a 1st channel on a 1st portion of the monitor, and to display a 2nd channel on a 2nd portion of the monitor, a multiple channel selection device, a control system which receives various inputs and provides various outputs based on selection criteria, including the inputs of:

a status indication of preview and review mode, a sequential selection device identification, a list associated with the sequential selection device, and provides an output for control of the channel selection devices, and a mode memory to designate the mode of operation as review or preview.

2. The apparatus of claim 1 for the display of multiple images on a monitor wherein the sequential selection device is an up channel selector.

3. The apparatus of claim 1 for the display of multiple images on a monitor wherein the sequential selection device is a down channel selector.

4. The apparatus of claim 1 for the display of multiple images on a monitor wherein the sequential selection device is a favorite channel selector.

5. The apparatus of claim 4 for the display of multiple images on a monitor wherein the favorite channel selector is a super quick view channel selector.

6. The apparatus of claim 1 for the display of multiple images on a monitor wherein the list is a static list.

7. The apparatus of claim 1 for the display of multiple images on a monitor wherein the list is a dynamic list.

8. The apparatus of claim 7 for the display of multiple images on a monitor wherein the dynamic list comprises a database plus selection criteria.

9. The apparatus of claim 1 for the display of multiple images on a monitor wherein the monitor is a television display.

10. The apparatus of claim 1 for the display of multiple images on a monitor wherein the monitor is a computer monitor.

* * * * *